United States Patent [19]

Nishino et al.

[11] Patent Number: 5,318,649
[45] Date of Patent: Jun. 7, 1994

[54] LAMINATES AND PROCESS FOR PRODUCING THE SAME

[75] Inventors: Minoru Nishino; Satoshi Nagai, both of Tokyo; Noboru Yamaguchi, Chiba; Yuji Hatou, Tokyo, all of Japan

[73] Assignees: Sumitomo Chemical Company, Limited, Osaka; Sanvic Incorporation, Tokyo, both of Japan

[21] Appl. No.: 18,270

[22] Filed: Feb. 16, 1993

Related U.S. Application Data

[62] Division of Ser. No. 629,881, Dec. 19, 1990, Pat. No. 5,219,649.

[30] Foreign Application Priority Data

Dec. 20, 1989 [JP] Japan .................................. 1-331996

[51] Int. Cl.⁵ .................................................. B29C 47/06
[52] U.S. Cl. .......................... 156/244.27; 156/244.11; 264/321
[58] Field of Search ................. 264/45.9, 171, 46.1, 264/321; 156/244.11, 244.27

[56] References Cited

U.S. PATENT DOCUMENTS

| | | | |
|---|---|---|---|
| 3,331,900 | 7/1967 | Thomas | 264/45.9 |
| 3,669,794 | 6/1972 | Mazur | 156/244.27 |
| 3,741,844 | 6/1973 | Schwartz | 156/244.11 |
| 4,409,286 | 10/1983 | DeCroix | 264/171 |
| 4,567,097 | 1/1986 | Yazaki et al. | 428/317.7 |
| 4,619,799 | 10/1986 | Teerling | 264/101 |
| 4,885,196 | 12/1989 | Herrington | 264/45.9 |
| 4,941,935 | 7/1990 | Gregory | 156/243 |
| 4,954,550 | 9/1990 | Sorg | 524/271 |

FOREIGN PATENT DOCUMENTS 3822933  1/1990  Fed. Rep. of Germany ..... 264/45.9

Primary Examiner—Allan R. Kuhns
Attorney, Agent, or Firm—Sughrue, Mion, Zinn, Macpeak & Seas

[57] ABSTRACT

A laminate comprising a soft polyolefin resin layer, an ethylene-unsaturated carboxylic acid ester-maleic anhydride terpolymer resin layer, and a soft urethane foam resin layer is disclosed. The laminate is produced by a process comprising co-extruding a soft polyolefin resin and an ethylene-unsaturated carboxylic acid ester-maleic anhydride terpolymer resin to prepare a two-layer sheet and continuously laminating a soft urethane foam fabricated in a stratiform state on the ethylene-unsaturated carboxylic acid ester-maleic anhydride terpolymer resin layer by hot pressing. The laminate has a satisfactory appearance, toughness, a soft touch, and a cushioning effect.

1 Claim, 2 Drawing Sheets

LAMINATES AND PROCESS FOR PRODUCING THE SAME

This is a division of application Ser. No. 07/629,881 filed Dec. 19, 1990, now U.S. Pat. No. 5,219,649.

FIELD OF THE INVENTION

This invention relates to laminates and a process for producing the same. More particularly, it relates to a laminate comprising a soft polyolefin resin layer and a soft urethane foam layer, which has a soft touch and a cushioning effect as well as a satisfactory appearance and toughness, and to a process for producing the same.

BACKGROUND OF THE INVENTION

Laminated products obtained by bonding a soft polyvinyl chloride (PVC) film or sheet and a urethane foam by heat or with an adhesive have a satisfactory appearance, toughness, a soft touch, and a cushioning effect and have been widely used as cushioning materials for furniture, outer covering materials for bags and shoes, automobile linings, e.g., door liners and ceiling coverings, and the like.

However, soft PVC of these laminates involves various problems arising from a plasticizer used therein for softening. For example, when soft PVC is in contact with other materials such as plastics, copied or printed matters, etc., the plasticizer migrates thereto to cause contamination of both soft. PVC and the contacting materials. Further, the plasticizer is scratched out on contact with human bodies or clothing, which results in hardening or cracking of the soft PVC. When soft PVC is used for a long time especially in a high temperature as in car interiors, the plasticizer is evaporated to cause hardening or cracking of the PVC sheet. Moreover, soft PVC undergoes deterioration by heat or light and is liable to change its color to yellowish brown.

In the light of these defects of conventionally employed soft PVC, soft polyolefin resins have been extending use in place of soft PVC.

Cushioning covering materials comprising a soft polyolefin resin have been produced by molding a soft polyolefin resin into a film or a sheet by means of a T die extruder or a calendering machine simultaneously with heat bonding with a 10 to 40-fold expanded sheet of a polyolefin resin, e.g., polyethylene or polypropylene.

However, covering materials having a highly expanded polyolefin sheet have the following disadvantages:

(1) Since an expanded foam of polyolefins, e.g., polyethylene and polypropylene, undergoes compression set, it does not completely recover even on relieving a compressive force when it is deformed to a great degree, or for a long time, or repeatedly. For example, compression set of a polyolefin foam as measured in accordance with JIS-K6767 (Method of Compression Set Test, deformation: 25%) is shown in Table 1 below in comparison with that of a urethane foam.

TABLE 1

| Plastic Foam | Compression Set (%) |
| --- | --- |
| Polyethylene foam | 3–10 |
| Polypropylene foam | 5–15 |
| Urethane foam | 0–1.5 |

(2) Production of polyolefin foams requires at least a step of mixing a blowing agent with a polyolefin resin and extruding, a step of crosslinking, and a step of expansion and winding and thus entails a high cost.

On the other hand, a soft urethane foam which has been used in soft PVC laminates is superior to polyolefin foams in the following points.

(1) A soft urethane foam, even when deformed to a great degree, or f or a long time, or in a repeated manner, nearly 100% recovers due to its small compression set.

(2) Production is completed simply by mixing liquid materials including a polyfunctional polyol, a diisocyanate, a catalyst, water, additives, etc. Solidification by crosslinking and expansion simultaneously proceed and, after completion of expansion, the expanded body is required only to be fabricated into a sheet. Therefore, an expanded body having a higher degree of expansion can be obtained through a smaller number of steps as compared with polyolefin foams. The cost per unit volume is about half the cost of the highly expanded polypropylene foam and about 1/1.5 that of the highly expanded polyethylene foam.

Accordingly, lamination of a soft urethane foam and a soft olefin resin film or sheet would provide the best cushioning material. These two materials, however, are not at all compatible with each other so that they cannot be laminated by application of heat but by using an adhesive. Namely, a laminate is produced, without any other alternative, by a process comprising first preparing a soft olefin resin sheet, re-heating the sheet with a two-pack crosslinkable urethane adhesive applied thereon, and then adhering a soft urethane foam thereto. Such a process not only entails an increased number of steps and an increased cost but also finds difficulty in obtaining a perfect laminate free from layer separation.

SUMMARY OF THE INVENTION

An object of the present invention is to provide a laminate having a satisfactory appearance, toughness, a soft touch, and a cushioning effect.

Another object of the present invention is to provide a process for producing the above-described laminate, in which a soft polyolefin resin film or sheet is extruded simultaneously with being heat bonded with a soft urethane foam, similarly to the production of a laminate of a soft polyolefin resin and a polyolefin foam.

The present invention relates to a laminate comprising a soft polyolefin resin layer, an ethylene-unsaturated carboxylic acid ester-maleic anhydride terpolymer resin layer, and a soft urethane foam resin layer.

The present invention also relates to a process for producing the above-described laminate, which comprises co-extruding a soft polyolefin resin and an ethylene-unsaturated carboxylic acid ester-maleic anhydride terpolymer resin to prepare a two-layer sheet and continuously laminating a soft urethane foam fabricated in a stratiform state on the ethylene-unsaturated carboxylic acid ester-maleic anhydride terpolymer resin layer by hot pressing.

DETAILED DESCRIPTION OF THE INVENTION

Figure 1:
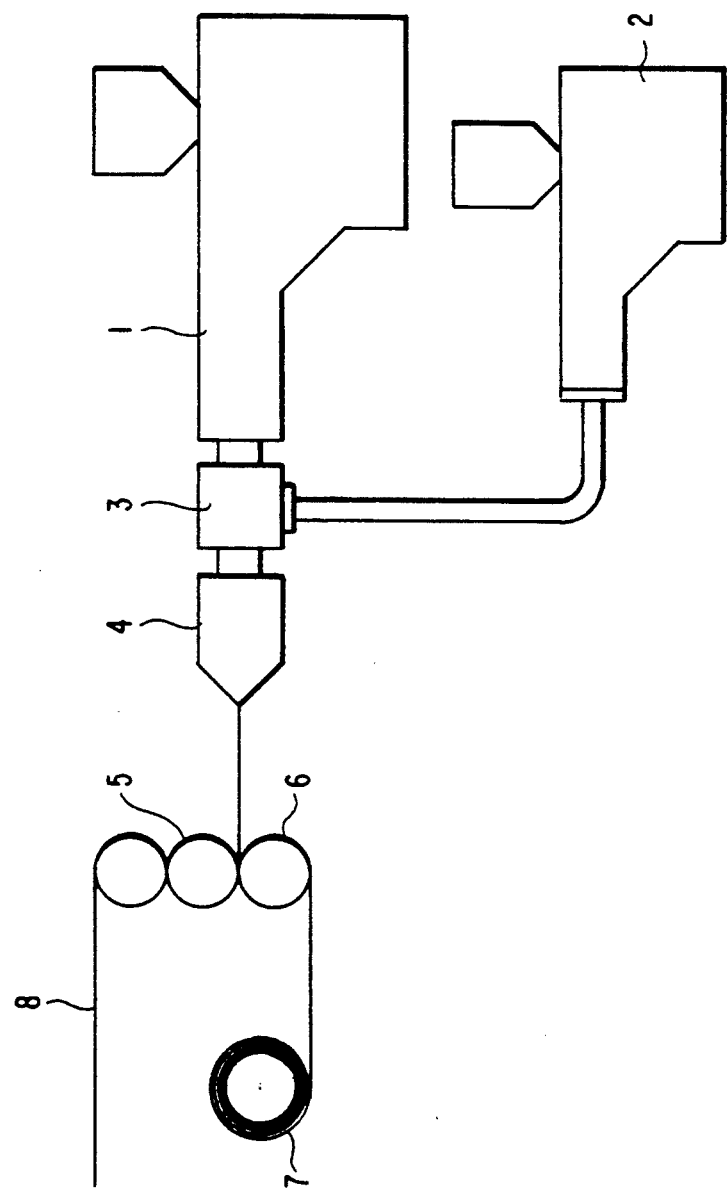
FIG. 1 illustrates a side view of the sheet forming apparatus used in Example 1.

The soft polyolefin resin which can be used in the present invention include copolymers comprising ethylene as a major component and an α-olefin, an unsaturated vinyl ester (e.g., vinyl acetate), an unsaturated carboxylic acid ester (e.g., methyl acrylate, ethyl acrylate, methyl methacrylate), etc.; and copolymers of ethylene and an unsaturated carboxylic acid and metal salts thereof.

Also included in employable soft polyolefin resins are a polymer blend of an olefin rubber (e.g., an ethylene-propylene rubber, an ethylene-propylene-diene terpolymer) or a partially crosslinked product. thereof and an olefin resin (e.g., polyethylene, polypropylene); a dynamic crosslinked product of such a polymer blend; and a polymer blend comprising the above-mentioned blend or its dynamic crosslinked product and an olefin resin (e.g., polyethylene, polypropylene).

These soft polyolefin resins may be used either individually or in combination of two or more thereof.

The ethylene-unsaturated carboxylic acid ester-maleic anhydride terpolymer which can be used in the present invention preferably comprises from 65 to 95% by weight of an ethylene unit, from 5 to 30% by weight of an unsaturated carboxylic acid ester unit, and from 1 to 5% by weight of a maleic anhydride unit and has a melt flow rate ranging from 0.1 to 100 g/10 min.

The unsaturated carboxylic acid ester comonomer of the above-described terpolymer includes alkyl esters of unsaturated carboxylic acids having from 3 to 8 carbon atoms (e.g., acrylic acid, methacrylic acid). Specific examples include methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate, and isobutyl methacrylate, with methyl acrylate, ethyl acrylate, n-butyl acrylate, and methyl methacrylate being particularly preferred.

These monomers may be used either individually or in combination of two or more thereof.

If the unsaturated carboxylic acid ester unit content in the terpolymer is less than 5% by weight, the effect of improving adhesion is small. If it exceeds 30% by weight, though sufficient adhesive strength can be obtained, the production cost so much increases and, also, the odor of the resulting laminate becomes offensive.

If the maleic anhydride unit content in the terpolymer is less than 1% by weight, the effect of improving adhesion is lessened. If it is more than 5% by weight, the production cost increases though sufficient adhesive strength is obtained.

An ethylene-unsaturated carboxylic acid ester-maleic anhydride terpolymer having a melt flow rate lower than 0.1 g/10 min. is poor in extrudability due to too a high melt viscosity. If the melt flow rate is higher than 100 g/10 min., the terpolymer exhibits poor adhesive strength.

The ethylene-unsaturated carboxylic acid ester-maleic anhydride terpolymer which can be used in this invention may contain other known compounding additives, such as weathering agents, antioxidants, antistatic agents, lubricants, anti-blocking agents, pigments, organic or inorganic fillers, and so on.

The laminate of the present invention can be produced by co-extruding a thin film of the ethylene-unsaturated carboxylic acid ester-maleic anhydride terpolymer which exhibits strong heat adhesion to both of an olefin resin and an urethane resin (this terpolymer being hereinafter referred to as an adhesive resin) together with a soft polyolefin resin through a T die and press bonding a soft urethane foam to the adhesive resin surface under heat.

The soft polyolefin resin layer and the adhesive resin layer are not particularly limited in thickness. A preferred thickness of the former is from 0.1 to 1.0 mm, and that of the latter is from 0.01 to 0.1 mm.

Apparatus for multi-layer sheet forming which can be used in the present invention include any apparatus utilizing a T die. For example, a feed block apparatus installed with a multi-layer forming device between an extruder and a T die or a multi-layer T die having a multi-layer forming mechanism within a T die can be employed.

The present invention is now illustrated in greater detail with reference to the following examples, but it should be understood that the present invention is not deemed to be limited thereto.

In Examples and Comparative Examples, physical properties were evaluated according to the following test method.

1) Melt Flow Rate (MFR)

JIS-K6760

2) Tensile Strength and Elongation

JIS-K7113

3) Cold Resistance

ASTM-D1709, Method A, at −40° C.

4) Compression Set

JIS-K6767, measured after 22 hours at a compression of 25%.

5) Peel Strength

Peel angle: 180°

6) Migration to Styrol Glossy Plate

The surface layer of a laminate was brought into contact with a styrol glossy plate under a pressure of 27 g/cm$^2$ at 80° C. for 4 hours, and (1) degree of discoloration ($\Delta$E) and (2) migration were measured.

7) Light and Heat Resistance

A laminate was exposed to light in a fade-o-meter at 83° C. for 500 hours, and (1) degree of discoloration ($\Delta$E) and (2) tensile strength retention and elongation retention (JIS-K7113) were measured.

8) Volatile Loss

100° C., 120 hours

Substrates and adhesive resins used in Examples and Comparative Examples are shown below.

1) Soft Polyolefin Resin
   Sumitomo TPE® WT 153 (produced by Sumitomo Chemical Company, Limited; hereinafter abbreviated as TPE)
   Ethylene-α-Olefin Copolymer Resin:
   Excellen® VL 200 (produced by Sumitomo Chemical Company, Limited; MFR: 2 g/10 min;

density: 0.900 g/cm³; hereinafter abbreviated as VL)

3) Soft PVC:
   Soft polyvinyl chloride resin sheet containing 50% plasticizer (converted to DOP) (hereinafter abbreviated as PVC)

4) Soft Urethane Foam:
   Thickness: 4 mm; density: 0.022 g/cm³ (hereinafter abbreviated as PUF)

5) Polypropylene (PP) Foam:
   25-Fold expanded sheet; thickness: 3 mm; density: 0.035 g/cm³

6) Polyethylene (PE) Foam:
   25-Fold expanded sheet; thickness: 3 mm; density: 0.034 g/cm³

7) Ethylene-Unsaturated Carboxylic Acid Ester-Maleic Anhydride Terpolymer Resin:
   E-EA-MAH terpolymer resin (E: ethylene; EA: ethyl acrylate; MAH: maleic anhydride); Bondine® TX 8030 (produced by Sumika CdF Chimie Co., Ltd.; MFR: 3 g/10 min; EA: 12%; MAH: 3%; hereinafter referred to as an adhesive resin)

EXAMPLE 1

A sheet train shown in FIG. 1 was used. TPE and the adhesive resin were charged in main extruder (1) having a diameter of 90 nun and secondary extruder (2) having a diameter of 65 mm, respectively, and extruded at a temperature of 210° C. TPE and the adhesive resin were forwarded to the central portion and the lower portion of feed block (3), respectively, to form a two-layer laminate composed of a TPE upper layer and an adhesive resin lower layer. The laminate was extruded from T die (4) and forwarded to haul-off roll (5) to obtain a sheet of 1,000 mm in width.

Figure 3:
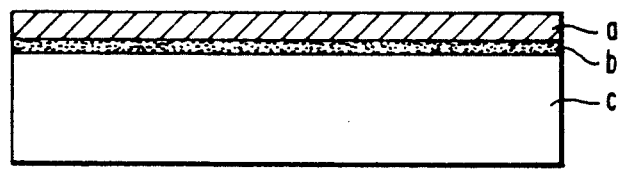
FIG. 3 illustrates a cross section of the laminate obtained in Example 1.

PUF (7) was fed to the lower side of the sheeting along haul-off roll (6). Haul-off roll (6) was pressed against haul-off roll (5) to adhere PUF to the sheet to obtain TPE/PUF laminate (8) having the structure shown in FIG. 3. In FIG. 3, (a) is a 0.45 mm thick TPE layer, (b) is a 0.05 mm thick adhesive resin layer, and (c) is a 4 mm thick PUF layer.

The resulting laminate exhibited the physical properties shown in Table 2 below and had excellent characteristics as required as a ceiling liner of automobiles.

COMPARATIVE EXAMPLE 1

A 0.5 mm thick PVC sheet and a PP foam sheet were laminated with an adhesive to obtain a laminate. The physical properties of the laminate are shown in Table 2.

TABLE 2

|  | Example 1 | Comparative Example 1 |
|---|---|---|
| Tensile Strength (kg/mm²) | 2.92 | 2.33 |
| Elongation (%) | 680 | 240 |
| Cold Resistance (g) | No break | 150 |
| Compression Set (%) | 0 | 14 |
| Surface Peel Strength | Foam sheet was broken. | Foam sheet was broken. |
| Migration to Styrol Sheet: |  |  |
| Degree of Discoloration (ΔE) | 0.59 | 5.89 |
| Migration (%) | 0.016 | 0.815 |
| Light and Heat Resistance: |  |  |

TABLE 2-continued

|  | Example 1 | Comparative Example 1 |
|---|---|---|
| Degree of Discoloration (ΔE) | 0.28 | 4.78 |
| Tensile Strength Retention (%) | 82.9 | 70.4 |
| Elongation Retention (%) | 55.4 | 33.3 |

EXAMPLE 2

Figure 2:
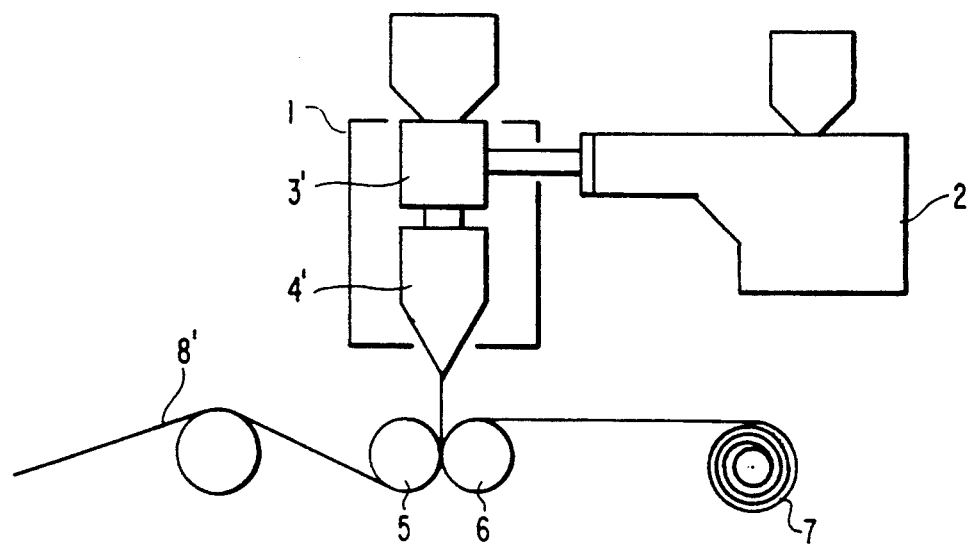
FIG. 2 illustrates a side view of the sheet forming apparatus used in Example 2.

A sheet train shown in FIG. 2 was used. VL and the adhesive resin were fed to main extruder (1) having a diameter of 90 mm and secondary extruder (2) having a diameter of 65 mm, respectively, and extruded at 190° C. Through distributing adapter (3'), VL was forwarded to the upper manifold of two-stage manifold T die (4'), and the adhesive resin to the lower manifold, and they were extruded from the T die as a two-layer laminate, taken up, and adhered with PUF in the same manner as in Example 1, to obtain VL/PUF laminate (8') having the structure shown in FIG. 4.

Figure 4:
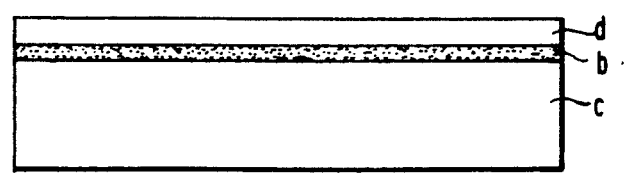
FIG. 4 illustrates a cross section of the laminate obtained in Example 2.

In FIG. 4, (d) is a 0.35 mm thick VL layer, and (b) and (c) have the same meanings as in FIG. 3.

The laminate had the physical properties shown in Table 3 below and was excellent as a cushioning covering material for bags and shoes.

COMPARATIVE EXAMPLE 2

A 0.45 mm thick PVC sheet and a PE foam sheet were adhered with an adhesive to obtain a laminate.

The physical properties of the laminate are shown in Table 3.

TABLE 3

|  | Example 2 | Comparative Example 2 |
|---|---|---|
| Tensile Strength (kg/mm²) | 2.95 | 1.77 |
| Elongation (%) | 776 | 256 |
| Cold Resistance (g) | No break | 135 |
| Compression Set (%) | 0 | 8.5 |
| Surface Peel Strength | Foam sheet was broken. | Foam sheet was broken. |
| Volatile Loss (%) | 0.21 | 3.7 |
| Migration to Styrol Sheet: |  |  |
| Degree of Discoloration (ΔE) | 0.48 | 6.57 |
| Migration (%) | 0.008 | 1.22 |

As described above, the present invention provides a laminate having a satisfactory appearance, toughness, a soft touch, and a cushioning effect and a process for producing the same.

While the invention has been described in detail and with reference to specific examples thereof, it will be apparent to one skilled in the art that various changes and modifications can be made therein without departing from the spirit and scope thereof.

What is claimed is:

1. A process for producing a laminate comprising a soft polyolefin resin layer, an ethylene-unsaturated carboxylic acid ester-maleic anhydride terpolymer resin layer, and a soft urethane foam resin layer, which comprises co-extruding a soft polyolefin resin and an ethylene-unsaturated carboxylic acid ester-maleic anhydride terpolymer resin to prepare a two-layer sheet and continuously laminating a soft urethane foam on the ethylene-unsaturated carboxylic acid ester-maleic anhydride terpolymer resin layer by hot pressing.

* * * * *